United States Patent
Takanashi

(10) Patent No.: US 11,102,425 B2
(45) Date of Patent: Aug. 24, 2021

(54) IMAGE PROCESSING APPARATUS AND IMAGE PROCESSING METHOD

(71) Applicant: SONY CORPORATION, Tokyo (JP)

(72) Inventor: Shogo Takanashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 16/482,877

(22) PCT Filed: Mar. 1, 2018

(86) PCT No.: PCT/JP2018/007905
§ 371 (c)(1),
(2) Date: Aug. 1, 2019

(87) PCT Pub. No.: WO2018/163977
PCT Pub. Date: Sep. 13, 2018

(65) Prior Publication Data
US 2019/0364225 A1    Nov. 28, 2019

(30) Foreign Application Priority Data
Mar. 8, 2017 (JP) .............................. JP2017-043471

(51) Int. Cl.
*H04N 5/225* (2006.01)
*H04N 5/272* (2006.01)
(Continued)

(52) U.S. Cl.
CPC ......... *H04N 5/272* (2013.01); *G06K 9/00228* (2013.01); *G06T 5/50* (2013.01); *G06T 11/001* (2013.01); *H04N 7/0117* (2013.01)

(58) Field of Classification Search
CPC ........ H04N 5/272; H04N 5/262; H04N 5/265; H04N 5/23254; H04N 7/0117; G06T 5/50;
(Continued)

(56) References Cited

U.S. PATENT DOCUMENTS

| 8,639,032 B1* | 1/2014 | Voorhees | G06F 16/739 |
| | | | 382/176 |
| 8,761,582 B2* | 6/2014 | Kasuya | G06T 5/005 |
| | | | 386/281 |

(Continued)

FOREIGN PATENT DOCUMENTS

| JP | 2003-179888 A | 6/2003 |
| JP | 2011-44061 A | 3/2011 |

(Continued)

OTHER PUBLICATIONS

International Search Report dated May 1, 2018 in PCT/JP2018/007905 filed on Mar. 1, 2018.

*Primary Examiner* — Kelly L Jerabek
(74) *Attorney, Agent, or Firm* — Oblon, McClelland, Maier & Neustadt, L.L.P.

(57) ABSTRACT

Visibility of a description on a description field hidden by a presenter is to be ensured while maintaining a positional relationship between the presenter and the description on the description field.
The moving image data obtained by imaging a state where the presenter is giving the description onto the description field is processed to determine the description portion. Display data for displaying each of portions determined to be the description portion as a description is generated and superimposed on moving image data. For example, a difference value for each of pixels between a current frame image and a reference frame image is extracted, a group including a series of consecutive pixels having a difference value being a threshold or more is grasped and then, whether or not the group is a description portion is determined for each of the groups.

15 Claims, 8 Drawing Sheets

(51) Int. Cl.
  *G06K 9/00*  (2006.01)
  *G06T 5/50*  (2006.01)
  *G06T 11/00* (2006.01)
  *H04N 7/01*  (2006.01)

(58) Field of Classification Search
  CPC ... G06T 11/60; G06T 11/001; G06K 9/00228; G03B 21/56
  See application file for complete search history.

(56) References Cited

U.S. PATENT DOCUMENTS

| | | | |
|---|---|---|---|
| 9,183,605 B2* | 11/2015 | Matsuoka | G06F 3/1415 |
| 10,547,768 B2* | 1/2020 | Bostick | H04N 5/2228 |
| 2007/0222747 A1* | 9/2007 | Kritt | H04L 12/1827 |
| | | | 345/156 |
| 2012/0062594 A1* | 3/2012 | Campbell | G06T 11/00 |
| | | | 345/632 |
| 2014/0105563 A1* | 4/2014 | Voorhees | G09B 5/02 |
| | | | 386/224 |
| 2015/0271446 A1* | 9/2015 | Browne | H04N 7/15 |
| | | | 348/14.08 |

FOREIGN PATENT DOCUMENTS

| | | |
|---|---|---|
| JP | 2012-64214 A | 3/2012 |
| JP | 2014-10781 A | 1/2014 |
| JP | 2014-153419 A | 8/2014 |
| JP | 2015-69234 A | 4/2015 |
| JP | 2016-119567 A | 6/2016 |

\* cited by examiner (a)

(b)

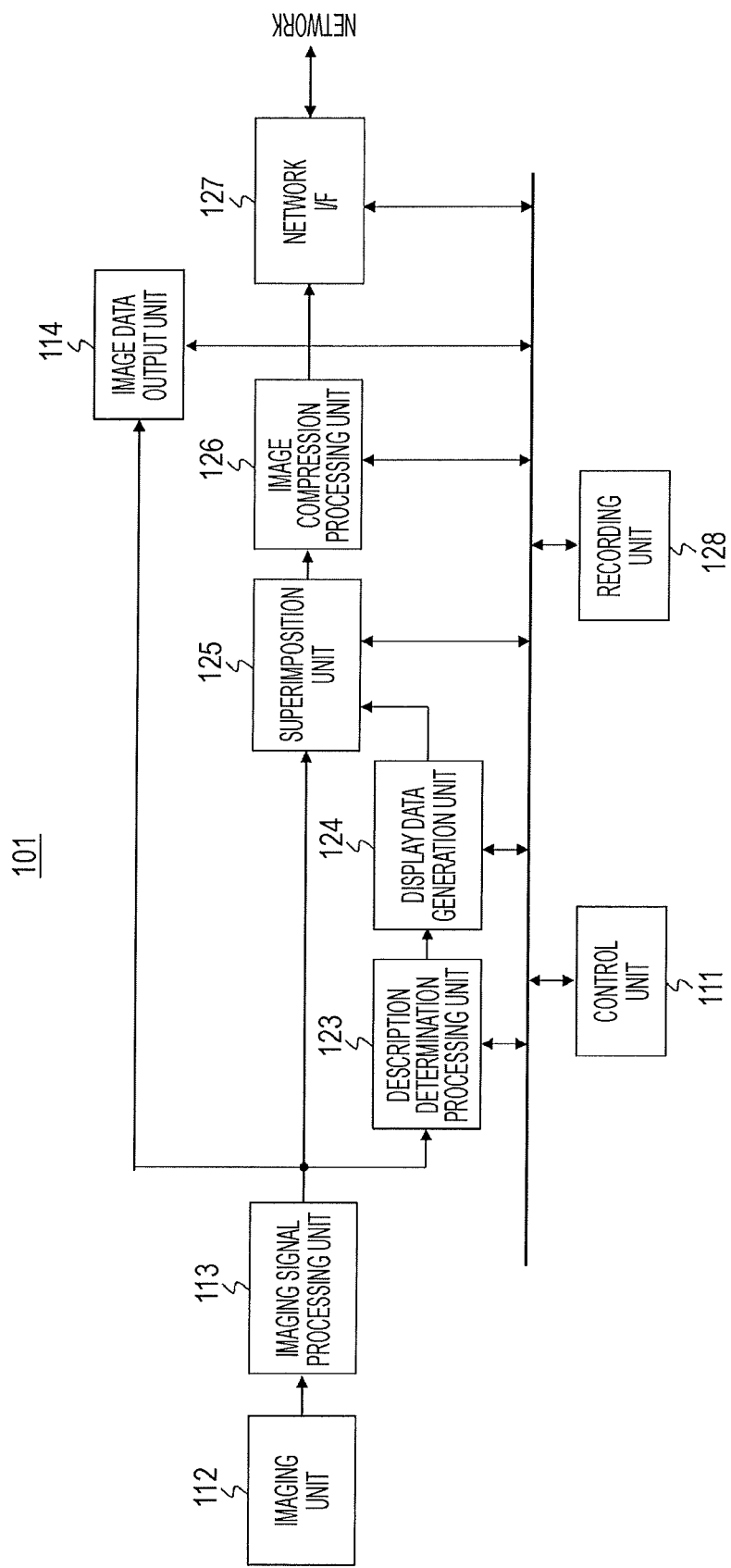

IMAGE PROCESSING APPARATUS AND IMAGE PROCESSING METHOD

TECHNICAL FIELD

The present technology relates to an image processing apparatus and an image processing method, and more particularly to an image processing apparatus, or the like, that processes moving image data obtained by imaging a state where a presenter is presenting a description onto a description field.

BACKGROUND ART

There have been several proposals to enhance visibility of text portions or the like in image display techniques in image distribution. For example, Patent Document 1 discloses a technique of extracting a text portion from an image and superimposing a text that has undergone processing of increasing resolution or text recognition onto the extracted text portion and thereby enhancing visibility. This technique supposes image distribution at a low bit rate, indicating that information in the text portion needs to have higher visibility.

Furthermore, Patent Document 2 discloses a technique of recognizing a text in an image, specifying text color and background color, and then adjusting the text color and the background color in display of the image. This is also considered to be one of the techniques for enhancing the visibility of text.

The techniques illustrated in Patent Documents 1 and 2 are to be applied to portions constantly appearing with low visibility in the image, such as portions having low bit rate or having text color similar to the background colors, and thus, would not be effective in a case where the visibility is lowered because of hidden text portions, or the like.

CITATION LIST

Patent Document

Patent Document 1: Japanese Patent Application Laid-Open No. 2003-179888
Patent Document 2: Japanese Patent Application Laid-Open No. 2015-069234

SUMMARY OF THE INVENTION

Problems to be Solved by the Invention

An object of the present technology is to ensure visibility of a description on a description field hidden by a presenter while maintaining a positional relationship between the presenter and the description on the description field.

Solutions to Problems

A concept of the present technology is in
an image processing apparatus including:
a description determination processing unit that processes moving image data obtained by imaging a state where a presenter is presenting a description onto a description field and determines a description portion; and
a description superimposition processing unit that generates display data for displaying each of the portions determined to be the description portion as a description and superimposes the display data over the moving image data.

In the present technology, the description determination processing unit processes moving image data obtained by imaging the state where the presenter is presenting a description onto the description field and determines the description portion. For example, the description determination processing unit may be configured to extract a difference value for each of pixels between a current frame image and a reference frame image, grasp a group including a series of consecutive pixels having the difference value being a threshold or more, and determine whether or not the group of pixels is the description portion for each of the groups.

In this case, for example, it is allowable to configure such that the description determination processing unit determines, for each of groups, whether or not the group is a description portion using a shape evaluation value, an extraction time evaluation value, and a stationary time evaluation value, the description determination processing unit obtains the shape evaluation value on the basis of an aspect ratio of a smallest quadrilateral that includes the group and a largest quadrilateral included within the group, obtains the extraction time evaluation value on the basis of a difference value between a current frame image and a reference frame image among a plurality of past frames, for pixels included in the group, and obtains the stationary time evaluation value on the basis of a difference value between the current frame image and a preceding frame image among the plurality of past frames, for pixels included in the group.

The description superimposition processing unit generates display data for displaying each of portions determined as a description portion as a description and superimposes the display data over moving image data. For example, the description superimposition processing unit may be configured to perform processing for enhancing the visibility of description when superimposing the display data over the moving image data.

In this case, the description superimposition processing unit may be configured to first perform processing of reducing resolution of the moving image data and thereafter may superimpose the display data over the moving image data, for example. Furthermore, in this case, the description superimposition processing unit may be configured, for example, to first process the display data so that each of portions determined to be the description portion is bordered and displayed, and thereafter may superimpose the display data over the moving image data. Furthermore, in this case, the description superimposition processing unit may be configured to first process the display data on the basis of color information of the moving image data so that the color of each of portions determined to be the description portion is differentiated from the color of a background image, and thereafter may superimpose the display data over the moving image data, for example.

In this manner, in the present technology, display data for displaying each of portions determined to be a description portion as a description is generated and superimposed over moving image data. Accordingly, this makes it possible to ensure visibility of a description on a description field hidden by a presenter while maintaining a positional relationship between the presenter and the description on the description field.

Note that, in the present technology, it is allowable to further include a description superimposition control unit that controls description superimposition processing unit not to superimpose the display data over the moving image data when a state where the face of the presenter is facing front is detected on the basis of the moving image data. In a case where the presenter stops one's hand and starts verbal presentation and commentary, presenter's expression and gestures would be more important information rather than the description, and the above would enable display of these without being disturbed by superimposed display of description.

Furthermore, in the present technology, it is allowable to further include, for example, an imaging unit that images a state where the presenter is presenting a description onto the description field, and an imaging signal processing unit that processes an imaging signal obtained by the imaging unit and obtains the moving image data. Furthermore, in the present technology, it is allowable to further include, for example, a transmission unit that transmits the moving image data obtained by the description superimposition processing unit to an external device.

Effects of the Invention

According to the present technology, it is possible to ensure the visibility of the description on the description field hidden by the presenter while maintaining the positional relationship between the presenter and the description. Note that effects described here in the present specification are provided for purposes of exemplary illustration and are not intended to be limiting. Still other additional effects may also be contemplated.

BRIEF DESCRIPTION OF DRAWINGS

FIG. 9 is a block diagram illustrating a configuration example of a camera.

MODE FOR CARRYING OUT THE INVENTION

Hereinafter, embodiments of the present invention (hereinafter, embodiment(s)) will be described. Note that description will be presented in the following order.
1. Embodiments
2. Modifications

1. EMBODIMENTS

[Configuration Example of Image Processing System]

Figure 1:
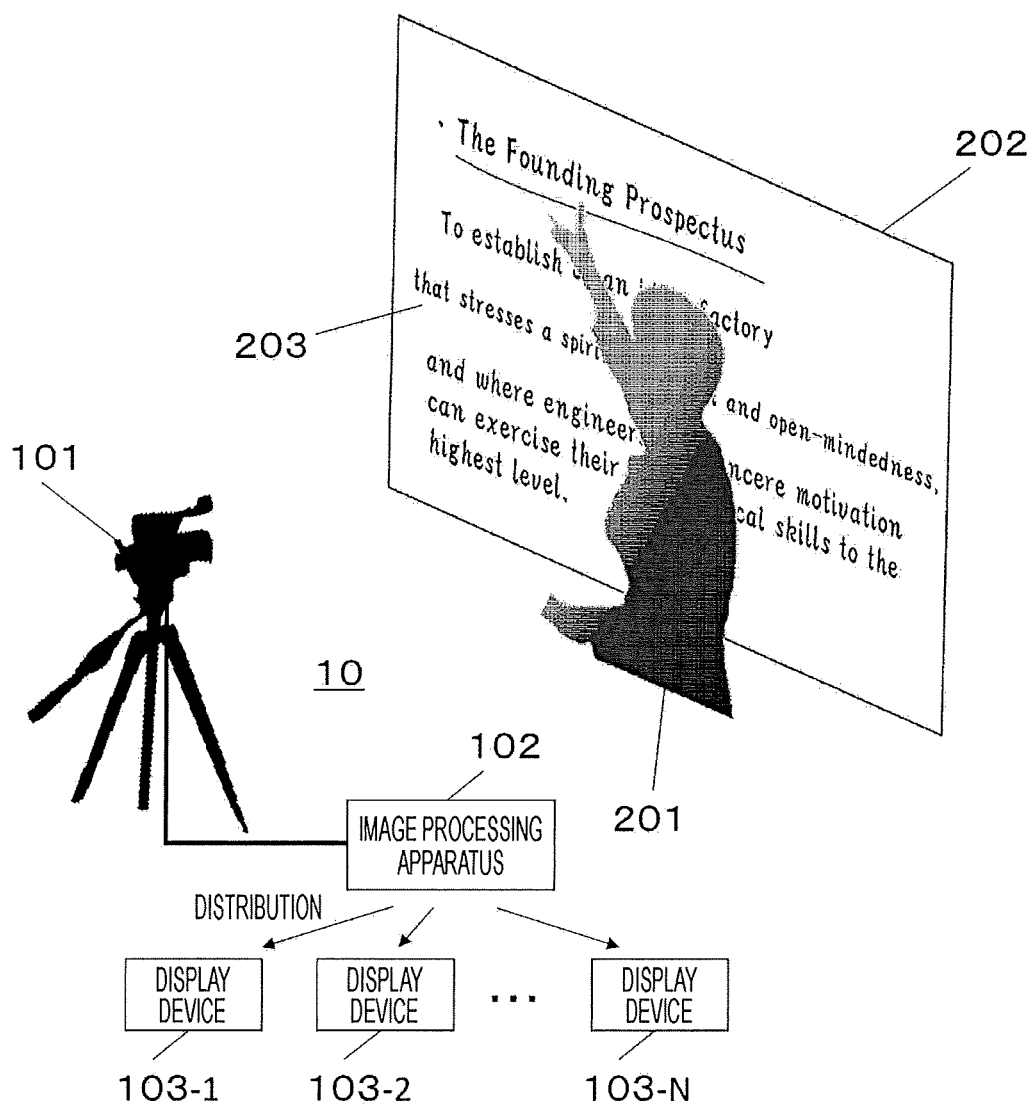
FIG. 1 is a block diagram illustrating a configuration example of an image processing system according to an embodiment.

FIG. 1 illustrates a configuration example of an image processing system 10 according to an embodiment. The image processing system 10 includes a camera 101, an image processing apparatus 102, and a predetermined number of display devices 103-1 to 103-N.

Figure 2:
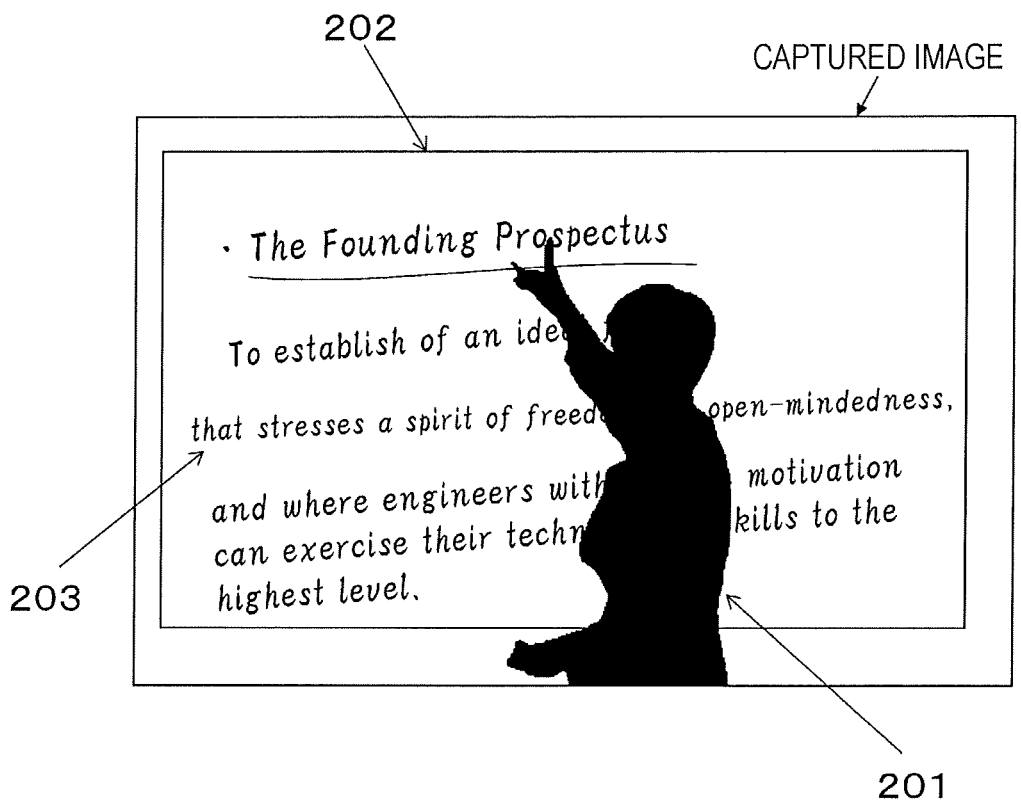
FIG. 2 is a view illustrating an example of a captured image of a certain frame obtained by a camera.

The camera 101 captures a state where a presenter 201 is giving presentation while adding a description 203 to a description field 202, and thereby obtains moving image data. FIG. 2 illustrates an example of a captured image of a certain frame obtained by the camera 101. In this captured image, the description 203 exists on the description field 202, and the presenter 201 exists in front of the description 203. By gestures given by the presenter 201, the description 203 hidden by the presenter 201 in this frame can be imaged by the camera 101 in the subsequent frame.

Examples of the presenter 201 include a lecturer such as a professor who gives a lecture to students in a university lecture room, an employee who gives a presentation to other employees in a company meeting room, and the like. The description field 202 may be a portion on which a presentation can be presented, such as a white board or a blackboard, or may be a wall portion on which a presentation can be presented, inside a lecture room or a meeting room.

The image processing apparatus 102 processes moving image data obtained by the camera 101 and determines a description portion, generates display data for displaying each of portions determined to be the description portion as a description, superimposes the display data over moving image data, and distributes the moving image data on which the display data has been superimposed, to the display devices 103-1 to 103-N. Distribution is performed by wireless or wired communication.

The display devices 103-1 to 103-N receive the moving image data on which the display data described above has been superimposed from the image processing apparatus 102, and display an image on the basis of the moving image data. In this case, the image displayed on the display is an image on which the description has been superimposed. Accordingly, this makes it possible to ensure visibility of the description 203 on the description field 202 hidden by the presenter 201 while maintaining a positional relationship between the presenter 201 and the description 203.

The layout positions of the display devices 103-1 to 103-N may be in a room such as a lecture room or a meeting room where the presenter 201 is currently giving presentations, or other lecture rooms or meeting rooms, or may even be a remote location or the like. In a case where the layout positions of the display devices 103-1 to 103-N are relatively close to the image processing apparatus 102, a wireless LAN such as Wi-Fi can be used. In contrast, in a case where the layout position of the display devices 103-1 to 103-N is a remote location, it would be possible to use distribution via the Internet or the like.

Distribution of moving image data from the image processing apparatus 102 to the display devices 103-1 to 103-N may be implemented in any manner other than live. For example, moving image data obtained by the image processing apparatus 102 may be recorded and stored in a recording unit, reproduced at an appropriate timing to be distributed to the display devices 103-1 to 103-N.

Details of the image processing apparatus 102 will be described. The image processing apparatus 102 extracts a difference value for each of pixels between the current frame image and the reference frame image, grasps a group including a series of consecutive pixels having a difference value being a threshold or more, and then, determines whether or not the group is a description portion for each of the groups. Specifically, the image processing apparatus 102 uses a shape evaluation value, an extraction time evaluation value, and a stationary time evaluation value to determine whether or not the group is a description portion for each of the groups.

The image processing apparatus 102 obtains the shape evaluation value from an aspect ratio relationship between a smallest quadrilateral that includes the group and the largest quadrilateral that is included inside the group. Furthermore, the image processing apparatus 102 obtains the extraction time evaluation value on the basis of a difference value between the current frame image and the reference frame image in a plurality of past frames, for the pixels included in the group. Furthermore, the image processing apparatus 102 obtains the stationary time evaluation value on the basis of a difference value between the current frame image and a preceding frame image in a plurality of past frames, for the pixels included in the group.

Furthermore, the image processing apparatus 102 performs processing for enhancing the visibility of description when superimposing the display data over the moving image data. For example, the image processing apparatus 102 first performs processing of reducing resolution of the moving image data and thereafter superimposes the display data over the moving image data. Furthermore, the image processing apparatus 102 first processes the display data so that each of portions determined to be the description portion is bordered and displayed, and thereafter superimposes the display data over the moving image data, for example. Furthermore, for example, the image processing apparatus 102 first processes the display data on the basis of color information of the moving image data so that the color of each of portions determined to be the description portion is differentiated from the color of a background image, and thereafter superimposes the display data over the moving image data.

Figure 3:
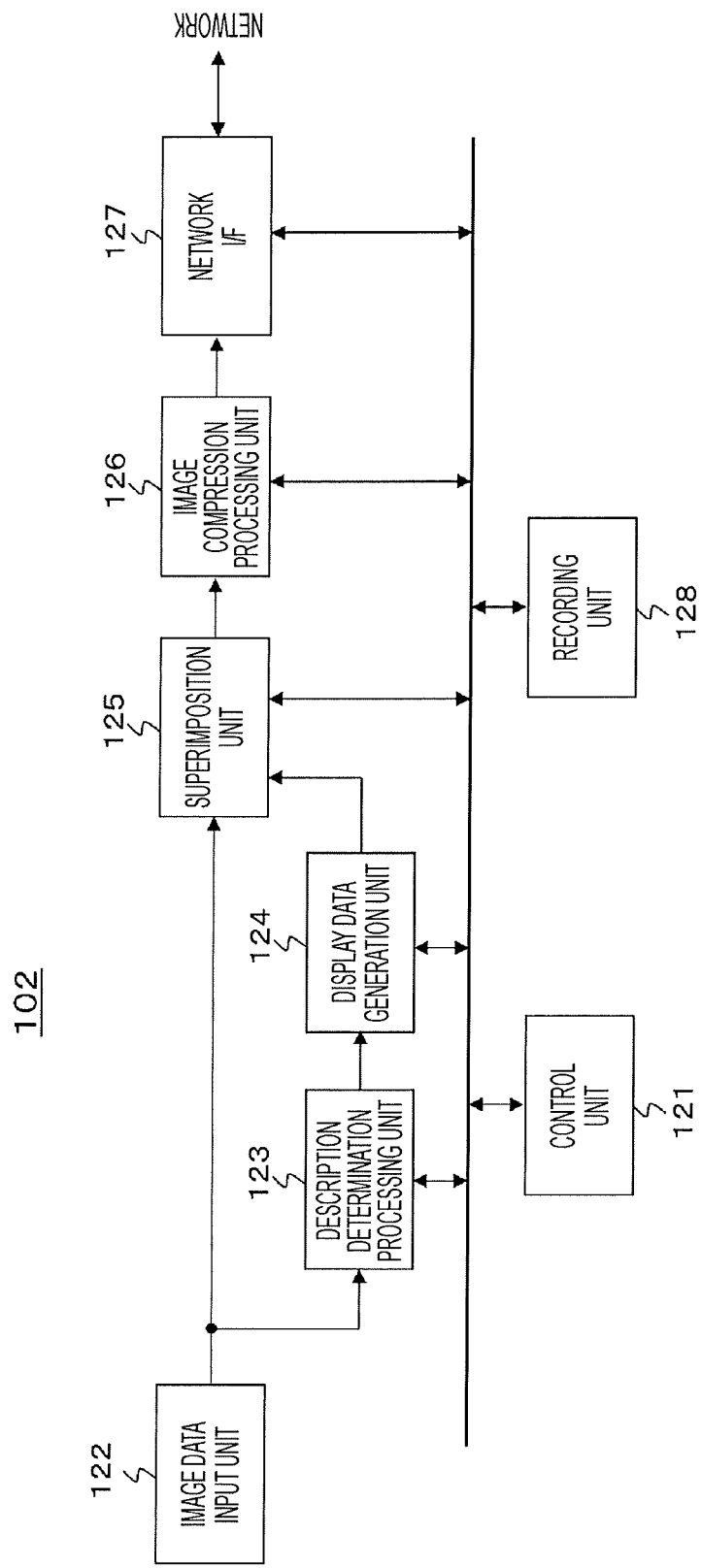
FIG. 3 is a block diagram illustrating a configuration example of an image processing apparatus.

FIG. 3 illustrates a configuration example of the image processing apparatus 102. The image processing apparatus 102 includes a control unit 121, an image data input unit 122, a description determination processing unit 123, a display data generation unit 124, a superimposition unit 125, an image compression processing unit 126, a network interface 127, and a recording unit 128.

The control unit 121 controls operation of individual portions of the image processing apparatus 102. The image data input unit 122 is a portion for inputting moving image data obtained by the camera 101. For example, the image data input unit 122 may be a cable connect portion that connects the camera 101. Furthermore, in a case where the image data input unit 122 is connected to the camera 101 by communication, for example, the image data input unit 122 may be a wireless or wired communication interface.

Figure 4:
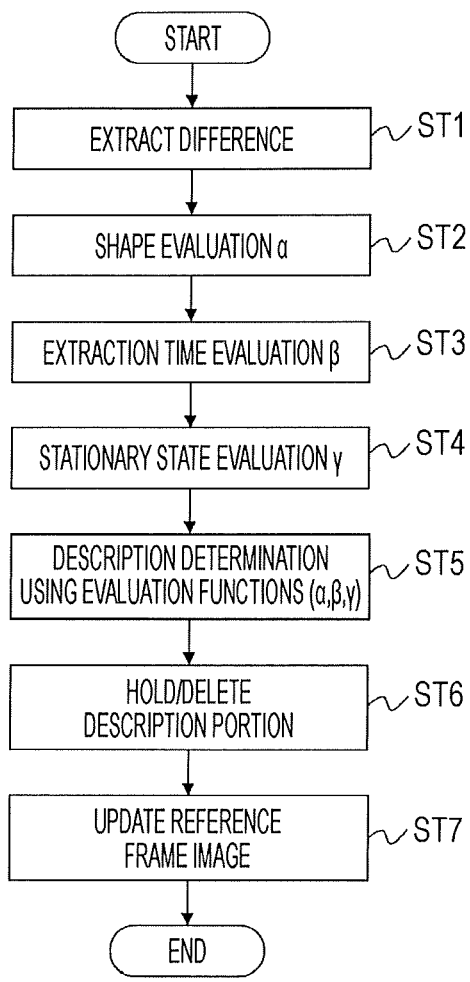
FIG. 4 is a flowchart illustrating processing in a description determination processing unit.

The description determination processing unit 123 processes the moving image data input to the image data input unit 122 and determines a description portion. The description determination processing unit 123 executes, for each of frames, processing from the start to the end of the flowchart in FIG. 4 by software on the basis of a program, for example.

First, in step ST1, the description determination processing unit 123 extracts, in a certain frame, a difference per pixel between an image of the frame and a reference frame image (initially, a frame image in a state before the description is performed in the description field 202), and then, extracts a pixel having a large pixel value difference, that is, a pixel in which a change has occurred from the state of the reference frame image on the basis of a difference extraction result, and finally grasps a group including a series of consecutive pixels like that (of predetermined quantity).

In this manner, the group grasped in step ST1 includes the portion of the description 203, and also includes a portion of the presenter 201 or the like. The following steps are used to determine for each of groups whether or not the group is a portion of the description 203. This determination uses values of shape evaluation, extraction time evaluation, and stationary time evaluation.

Figure 5:
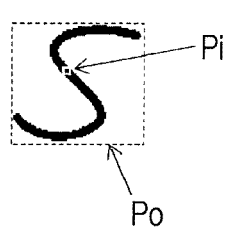
FIG. 5 is a view illustrating how to obtain a shape evaluation value.
Figure 5:
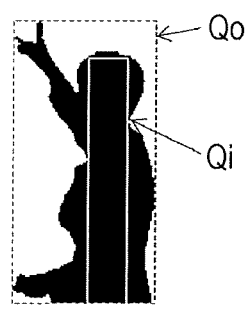

Next, the description determination processing unit 123 obtains a shape evaluation value $\alpha$ in step ST2. The description determination processing unit 123 obtains the value $\alpha$ on the basis of an aspect ratio relationship between the smallest quadrilateral (outer quadrilateral) that includes the group and the largest quadrilateral (inner quadrilateral) included in the group. FIG. 5(a) illustrates an example of a group corresponding to a portion of the description 203. A quadrilateral indicated by an arrow Po is an outer quadrilateral, and a quadrilateral indicated by an arrow Pi is an inner quadrilateral. Furthermore, FIG. 5(b) illustrates an example of a group corresponding to the portion of the presenter 201. A quadrilateral indicated by an arrow Qo is an outer quadrilateral, and a quadrilateral indicated by an arrow Qi is an inner quadrilateral.

In the case of the group corresponding to the portion of the description 203, the inner quadrilateral (Pi) is smaller than the outer quadrilateral (Po), leading to a high shape evaluation value $\alpha$. In contrast, in the case of a group corresponding to a portion of the presenter 201, the group is a larger group compared to the group corresponding to the portion of the description 203, and thus, the inner quadrilateral (Qi) also has a certain size with respect to the outer quadrilateral (Qo). Therefore, the shape evaluation value $\alpha$ is low.

Next, in step ST3, the description determination processing unit 123 obtains an extraction time evaluation value $\beta$. The description determination processing unit 123 obtains this value $\beta$ on the basis of a difference value, for the pixels included in the group, between the current frame image and the reference frame image among a plurality of past frames. The more the frames with large difference values, the higher the value $\beta$.

For example, the description determination processing unit 123 accumulates results of whether or not a certain frame is a frame having large difference from reference frame image (difference extraction frame) for the pixels (entire or partial pixels) included in the group, and determines the number of consecutive difference extraction frames (for example, an average value when this evaluation is performed on a plurality of pixels) as the evaluation value $\beta$.

In the case of the portion of the description 203, a large difference continues to be extracted after being described, leading to a high evaluation value $\beta$. In contrast, in the case of a portion of the presenter 201 who is moving, the extraction of a large difference would be interrupted after passage of the presenter 201, leading to a low evaluation value $\beta$. Note that the evaluation value $\beta$ might be high despite the fact that it is a portion of the presenter 201 in a case where the presenter 201 stops without moving.

Next, in step ST4, the description determination processing unit 123 obtains a stationary state evaluation value $\gamma$. The description determination processing unit 123 obtains this value $\gamma$ on the basis of a difference value, for the pixels included in the group, between the current frame image and a preceding frame image among a plurality of past frames. The more the frames with large difference values, the lower the value $\gamma$.

For example, the description determination processing unit 123 accumulates a pixel difference from the preceding frame for the pixels (entire or partial pixels) included in the group, and determines the reciprocal of the magnitude of the difference value (for example, an average value when this evaluation is performed on a plurality of pixels) as the evaluation value γ.

In the case of the portion of the description 203, the pixel difference value with respect to the preceding frame image would be zero or be a small value, leading to a high evaluation value γ. In contrast, in the case of the portion of the presenter 201 using gestures, the pixel difference value with respect to the preceding frame image is large, leading to a low evaluation value γ.

Next, in step ST5, the description determination processing unit 123 substitutes the individual evaluation values α, β, and γ respectively obtained in steps ST2 to ST4 into an evaluation function E (α, β, γ) to obtain an evaluation value for determination of whether or not the group is a description. Subsequently, when the evaluation value is larger than a threshold THr, the description determination processing unit 123 determines, in step ST5, that the group is a description portion (a portion of the description 203).

Next, in step ST6, the description determination processing unit 123 additionally retains, in principle, each of pixels included in the group determined to be the description portion in step ST5, as pixels of the description portion. In a case, however, where each of the pixels included in the group determined to be the description portion in this manner is a pixel retained as the description portion in the past, the pixel corresponds to the portion erased thereafter, and the pixel is to be deleted from the target of retention as the pixel of the description portion.

Here, retention is, for example, writing and retaining the value of each of pixels included in the group determined to be the description portion in a corresponding pixel position of a frame memory. Note that here, instead of writing an actual value of each of pixels included in the group determined to be the description portion into the corresponding pixel position of the frame memory, it is allowable to have a configuration that selectively retains pixel position information for each of pixels included in the group determined to be the description portion.

Next, in step ST7, the description determination processing unit 123 determines the value of each of pixels currently retained as the description portion as a value corresponding to the description 203 on the basis of the result of the retention or deletion in step ST6, generates a frame image using this value and determines this frame image as a new reference frame image. The reference frame image updated in this manner is to be used in the description determination processing in a succeeding frame.

Returning to FIG. 3, the display data generation unit 124 generates display data for displaying each of the pixels as a description portion on the basis of pixel information of the description portion updated after retention or deletion processing by the description determination processing unit 123 in each of frames.

The superimposition unit 125 superimposes the display data generated by the display data generation unit 124 over the moving image data input to the image data input unit 122. This makes it possible to superimpose and display the description 203 described on the description field 202 over the image based on the moving image data.

In this case, the superimposition unit 125 performs, for example, part or all of the following processing in order to enhance the visibility of the description 203 superimposed and displayed over the image.

For example, the superimposition unit 125 performs processing of reducing the resolution of moving image data such as high frequency component removal processing using a spatial low-pass filter, for example, and thereafter, superimposes display data over the moving image data. This operation makes it possible to blur the image based on the moving image data and enhance the visibility of the description 203 superimposed and displayed over the image.

Furthermore, the superimposition unit 125 first processes the display data so that each of portions determined to be the description portion is bordered and displayed, and thereafter superimposes the display data over the moving image data, for example. Note that the bordering processing may be performed by the display data generation unit 124.

For example, bordering processing using white would be applied when original color of the description portion is black, and conversely, bordering processing using black would be applied when original color of the description portion is white. The color of the bordering is not limited to this. Bordering performed in this manner would make it possible to enhance the visibility of the description 203 superimposed and displayed on the image based on the moving image data, in a case where the original color of the description portion is similar to the color of the clothes of the presenter 201, for example.

Furthermore, for example, the superimposition unit 125 first processes the display data color change processing on the basis of color information of the moving image data so that the color of each of portions determined to be the description portion is differentiated from the color of a background image (image based on moving image data), and thereafter superimposes the display data over the moving image data. Note that the color change processing may be performed by the display data generation unit 124. Display data color change processing performed in this manner would make it possible to enhance the visibility of the description 203 superimposed and displayed on the image based on the moving image data, in a case where the original color of the description portion is similar to the color of the clothes of the presenter 201, for example.

The image compression processing unit 126 performs data compression encoding processing using the MPEG method, for example, on moving image data over which display data has been superimposed by the superimposition unit 125, and thereby generates encoded image data. The network interface 127 transmits the encoded image data generated by the image compression processing unit 126 to the display devices 103-1 to 103-N via a wireless or wired network. Note that the encoded image data generated by the image compression processing unit 126 may be temporarily recorded in the recording unit 128, and the network interface 127 may read out the encoded image data from the recording unit 128 at an appropriate timing and may transmit the data to the display devices 103-1 to 103-N.

Operation of the image processing system 10 illustrated in FIG. 1 will be briefly described. The camera 101 images a state of the presenter 201 giving presentation while adding the description 203 to the description field 202, and thereby obtains moving image data. The moving image data is supplied to the image processing apparatus 102.

The image processing apparatus 102 processes the moving image data from the camera 101 and determines a description portion, and generates display data for displaying each of portions determined to be the description portion, as a description, and superimposes the display data over the moving image data. Subsequently, the moving image data (encoded image data) over which display data has been superimposed is distributed from the image processing apparatus 102 to the display devices 103-1 to 103-N through a wireless or wired network.

The display devices 103-1 to 103-N perform image display on the basis of the moving image data received from the image processing apparatus 102. In this case, the image displayed on the display is superimposed display in which description is superimposed and displayed over the image based on the moving image data.

Next, operation of the image processing apparatus 102 illustrated in FIG. 3 will be briefly described. Moving image data captured by the camera 101 is input to the image data input unit 122. The moving image data is supplied to the superimposition unit 125 and the description determination processing unit 123.

The description determination unit 123 processes the moving image data, determines a description portion for each of frames, and retains the determined portion as pixels of the description portion. Determination of whether or not the pixel is a description portion is performed by first extracting a difference value for each of pixels between the current frame image and the reference frame image, and then using a shape evaluation value, an extraction time evaluation value and a stationary time evaluation value for each of groups including a series of consecutive pixels having the difference value being a threshold or more.

In this case, the description 203 portion hidden by the presenter 201 in a certain period shifts to non-hidden state by the presenter 201 in another period by movement or gesture of the presenter 201. Accordingly, most of the description 203 portions described on the description field 202 are to be retained as pixels of the description portion after lapse of a certain amount of time.

Pixel information of the description portion updated for each of frames by the description determination processing unit 123 is transmitted to the display data generation unit 124. The display data generation unit 124 generates display data for displaying each of pixels as a description portion on the basis of pixel information of the description portion in each of frames. The display data is supplied to the superimposition unit 125.

The superimposition unit 125 superimposes the display data generated by the display data generation unit 124 over the moving image data input to the image data input unit 122. In this case, the superimposition unit 125 performs processing for enhancing the visibility of the description 203 superimposed and displayed over the image, for example, processing of reducing the resolution of moving image data, processing on the display data so that each of portions determined to be a description portion is to be bordered and displayed, processing of changing the color of display data so that the color of each of portions determined to be a description portion is differentiated from the color of the background image (image based on moving image data), or the like.

The moving image data over which the display data is superimposed is supplied from the superimposition unit 125 to the image compression processing unit 126. The image compression processing unit 126 performs data compression encoding processing using the MPEG method, for example, on moving image data over which display data is superimposed, thereby generating encoded image data.

The encoded image data is directly supplied to the network interface 127 or is once recorded in the recording unit 128, reproduced at an appropriate timing, and supplied to the network interface 127. The network interface 127 transmits the encoded image data to the display devices 103-1 to 103-N through a wireless or wired network.

Figure 6:
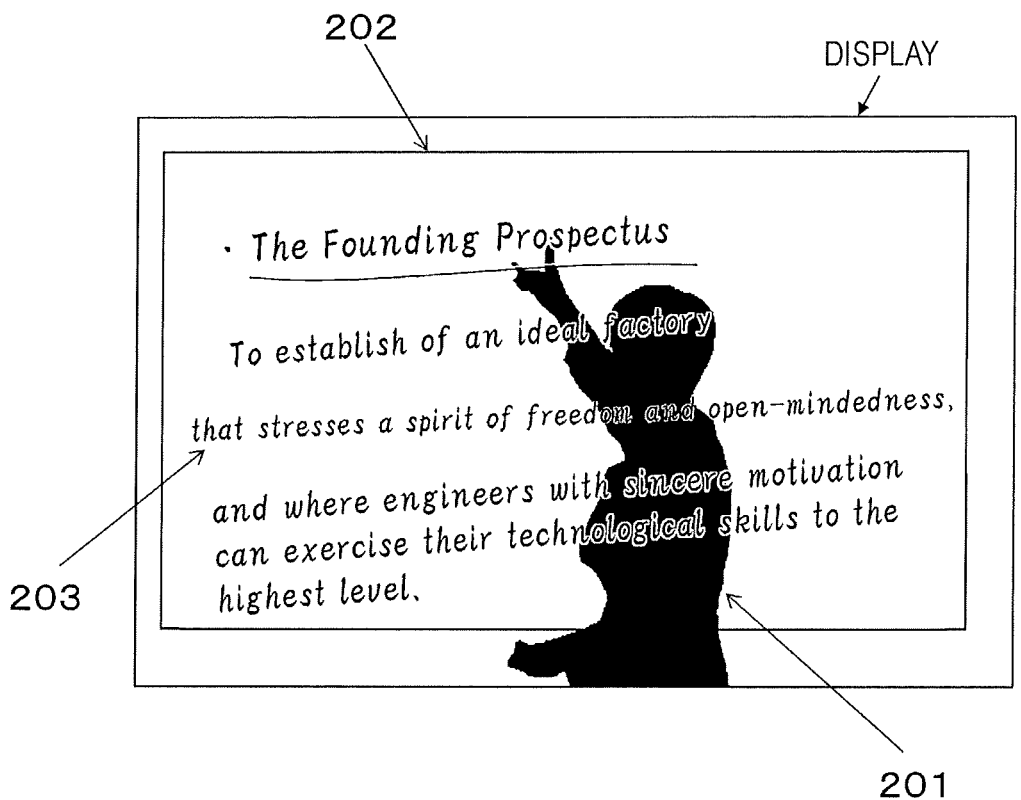
FIG. 6 is a view illustrating an example of a display image displayed on a display of a display device.

FIG. 6 illustrates an example of display images displayed on the displays of the display devices 103-1 to 103-N. In this display image, the description 203 based on display data is superimposed and displayed over an image based on moving image data in which the presenter 201 exists in front of the description field 202. Furthermore, in this example, portions of the description 203 are bordered and displayed. This makes it possible to ensure the visibility of the description 203 over the description field 202 hidden by the presenter 201 while maintaining a positional relationship between the presenter 201 and the description 203 on the description field 202.

As described above, in the image processing system 10 illustrated in FIG. 1, the image processing apparatus 102 generates display data for displaying each of portions determined to be a description portion as a description and superimposes the display data over the moving image data. Accordingly, this makes it possible to ensure visibility of the description 203 on the description field 202 hidden by the presenter 201 while maintaining a positional relationship between the presenter 201 and the description 203 on the description field 202.

Furthermore, in the image processing system 10 illustrated in FIG. 1, when the display data is superimposed over the moving image data, the image processing apparatus 102 performs processing for enhancing the visibility of the description 203 superimposed and displayed over the image, for example, processing of reducing the resolution of moving image data, processing on the display data so that each of portions determined to be a description portion is to be bordered and displayed, processing of changing the color of display data so that the color of each of portions determined to be a description portion is differentiated from the color of the background image (image based on moving image data), or the like. Accordingly, this makes it possible to enhance the visibility of the description 203 superimposed and displayed over the image.

2. MODIFICATION

Note that the above-described embodiment is an exemplary case where the description 203 is always superimposed and displayed over the image based on moving image data regardless of the state of the presenter 201. However, in a state where the presenter 201 starts talking while facing front, for example, lecture attendees or conference attendees are supposed to pay attention to every specific behavior of the presenter 201. In this case, it is allowable to configure not to display the description 203 superimposed over the image based on moving image data.

Figure 7:
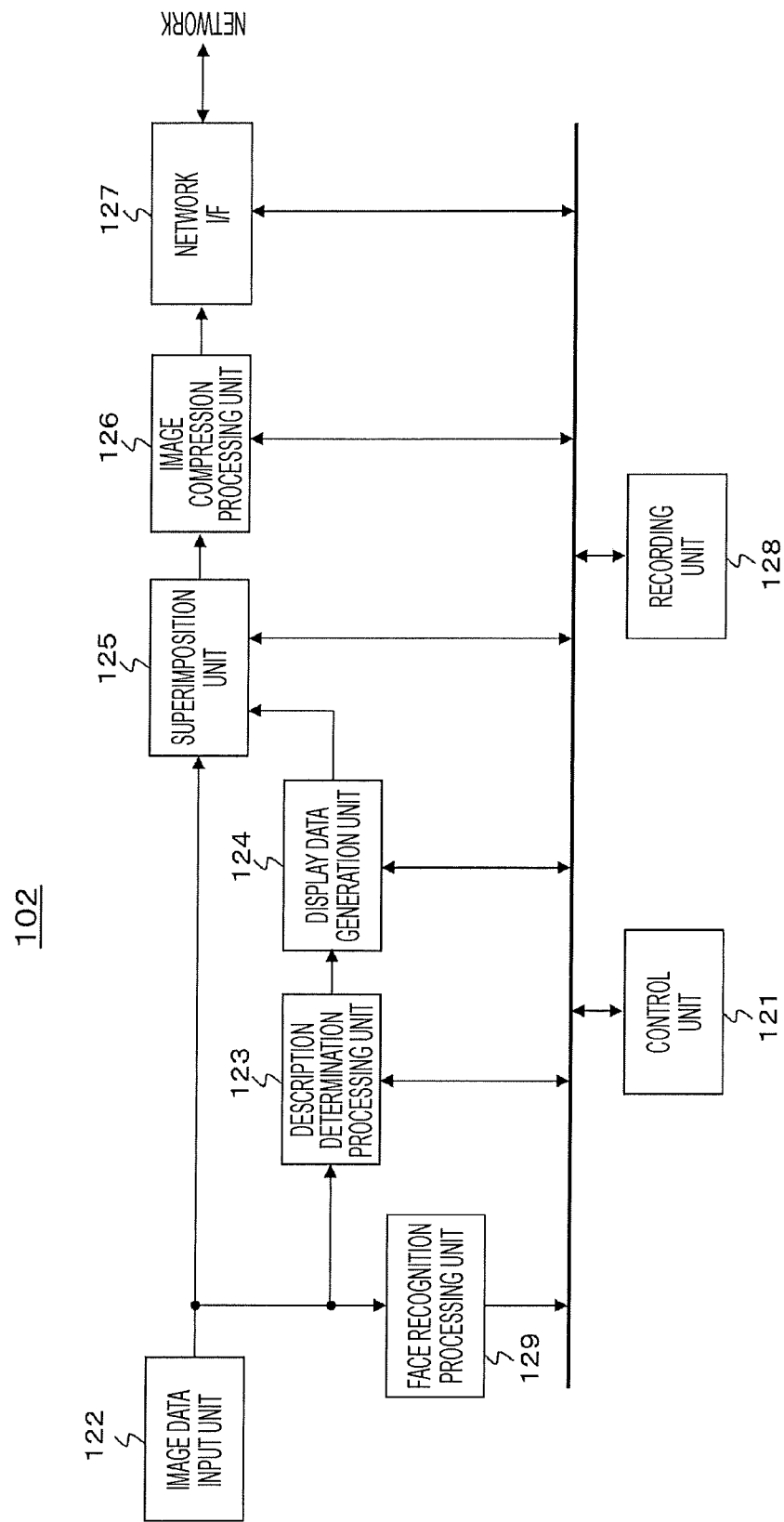
FIG. 7 is a block diagram illustrating another configuration example of the image processing apparatus.

FIG. 7 illustrates a configuration example of the image processing apparatus 102 in that case. In FIG. 7, portions corresponding to the portions in FIG. 3 are denoted by the same reference numerals, and detailed description is omitted as appropriate. A face recognition processing unit 129 processes moving image data input to the image data input unit 122 and recognizes the face of the presenter 201, and detects whether or not the presenter 201 is facing front. The face recognition processing unit 129 then transmits a detection result to the control unit 121.

When the presenter 201 is not facing front, the control unit 121 controls to activate the description determination processing unit 123, the display data generation unit 124, and the superimposition unit 125, similarly to the case of the above-described exemplary embodiment. In contrast, when the presenter 201 is facing front, the control unit 121 temporarily stops operation of the description determination processing unit 123 and the display data generation unit 124, and controls the superimposition unit 125 to output, with no change, the moving image data input to the image data input unit 122. Note that the operation of the description determination processing unit 123 may be continued even when the presenter 201 is facing front.

The other configuration and operation of the image processing apparatus 102 illustrated in FIG. 7 are similar to those of the image processing apparatus 102 illustrated in FIG. 3 described above.

Figure 8:
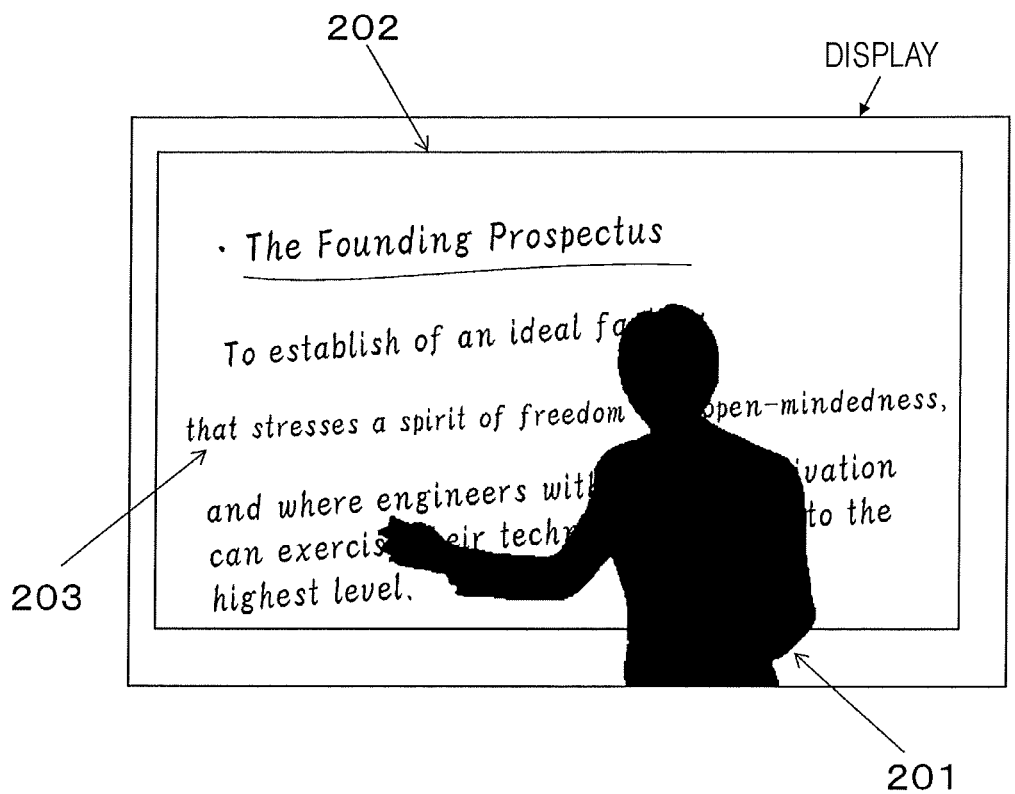
FIG. 8 is a view illustrating an example of a display image displayed on the display of the display device when the presenter is facing front.

FIG. 8 illustrates an example of a display image displayed on the display of each of the display devices 103-1 to 103-N when the presenter 201 is facing front. In this display image, the description 203 based on display data is not superimposed over an image based on moving image data in which the presenter 201 exists in front of the description field 202. This enables lecture attendees and conference attendees to pay more attention to every specific behavior of the presenter 201 through the display screen.

Note that suppressing the superimposing display of the description 203 over an image based on the moving image data is not limited to the time when the presenter 201 is facing front, and may also be applied to other cases. Furthermore, in the image processing apparatus 102 of FIG. 7, the face recognition processing unit 129 detects whether or not the presenter 201 is facing front, and suppresses display of the description 203 over the image based on the image data on the basis of the detection result. Alternatively, however, it is also possible to make intentional determination as to whether or not to superimpose and display the description 203 over an image based on moving image data.

Furthermore, in the above-described embodiment, the image processing apparatus 102 is provided separately from the camera 101. Alternatively, however, it is possible to use a configuration in which the function of the image processing apparatus 102 is provided inside the camera 101.

FIG. 9 illustrates a configuration example of the camera 101 in that case. The camera 101 includes a control unit 111, an imaging unit 112, an imaging signal processing unit 113, and an image data output unit 114. The control unit 111 controls operation of each of parts of the camera 101. The imaging unit 112 includes an imaging lens and an imaging device (not illustrated), captures an image, and outputs an imaging signal. Examples of the applicable imaging device include a charge coupled device (CCD) sensor, and a complementary metal oxide semiconductor (CMOS).

The imaging signal processing unit 113 performs sample-and-hold processing and gain control, analog to digital signal conversion, white balance adjustment, gamma correction, or the like, on the imaging signal (analog signal) output from the imaging unit 112, and thereby generates moving image data (captured image data). The image data output unit 114 outputs the moving image data generated by the imaging signal processing unit 113 to an external device. For example, the image data output unit 114 is a connector to connect a cable for connecting to an external device, for example. Furthermore, for example, the image data output unit 114 is a network interface that transmits moving image data to an external device via a wired or wireless network.

Furthermore, the camera 101 further includes the description determination processing unit 123, the display data generation unit 124, the superimposition unit 125, the image compression processing unit 126, the network interface 127, and the recording unit 128. These have been described in the above-described image processing apparatus 102 (refer to FIG. 3), and thus the description thereof is omitted here.

Furthermore, while the above-described embodiment is an example of processing the moving image data obtained by imaging the state where the presenter 201 is giving presentation while adding the description 203 to the description field 202, for example, a white board, a blackboard, etc., it is also possible to process other similar moving image data. For example, it is also possible to process the moving image data obtained by imaging a state where a presenter is giving a presentation while adding description on a sheet of paper on a desk in a similar manner so as to enhance visibility of the description.

Furthermore, the description on the description field 202 is not limited to the text, and may be a graphic or a mark, and may also include description presented over the description field 202 in addition to the written description.

Moreover, the present technology may also be configured as below.

(1) An image processing apparatus including:
a description determination processing unit that processes moving image data obtained by imaging a state where a presenter is presenting a description onto a description field and determines a description portion; and
a description superimposition processing unit that generates display data for displaying each of the portions determined to be the description portion as a description and superimposes the display data over the moving image data.

(2) The image processing apparatus according to (1),
in which the description determination processing unit extracts a difference value for each of pixels between a current frame image and a reference frame image, grasps a group including a series of consecutive pixels having the difference value being a threshold or more, and determines whether or not the group of pixels is the description portion for each of the groups.

(3) The image processing apparatus according to (2),
in which the description determination processing unit determines, for each of the groups, whether or not the group is the description portion using a shape evaluation value, an extraction time evaluation value, and a stationary time evaluation value,
the description determination processing unit
obtains the shape evaluation value on the basis of an aspect ratio relationship of a smallest quadrilateral that includes the group and a largest quadrilateral included within the group,
obtains the extraction time evaluation value on the basis of a difference value between a current frame image and a reference frame image among a plurality of past frames, for pixels included in the group, and
obtains the stationary time evaluation value on the basis of a difference value between the current frame image and a preceding frame image among the plurality of past frames, for pixels included in the group.

(4) The image processing apparatus according to any of (1) to (3),
in which the description superimposition processing unit performs processing for enhancing visibility of description when superimposing the display data over the moving image data.

(5) The image processing apparatus according to (4),
in which the description superimposition processing unit first performs processing of reducing resolution of the moving image data and thereafter superimposes the display data over the moving image data.

(6) The image processing apparatus according to (4) or (5),
in which the description superimposition processing unit first processes the display data so that each of portions determined to be the description portion is bordered and displayed, and thereafter superimposes the display data over the moving image data.

(7) The image processing apparatus according to any of (4) to (6), in which the description superimposition processing unit first processes the display data on the basis of color information of the moving image data so that color of each of portions determined to be the description portion is differentiated from color of a background image, and thereafter superimposes the display data over the moving image data.

(8) The image processing apparatus according to any of (1) to (7), further including a description superimposition control unit that controls description superimposition processing unit not to superimpose the display data over the moving image data when a state where a face of the presenter is facing front is detected on the basis of the moving image data.

(9) The image processing apparatus according to any of (1) to (8), further including:

an imaging unit that images a state where the presenter is presenting a description onto the description field; and an imaging signal processing unit that processes an imaging signal obtained by the imaging unit and obtains the moving image data.

(10) The image processing apparatus according to any of (1) to (9), further including a transmission unit that transmits the moving image data obtained by the description superimposition processing unit to an external device.

(11) An image processing method including:

a description determination processing step, performed by a description determination processing unit, of processing moving image data obtained by imaging a state where a presenter is presenting a description onto a description field and determining a description portion; and a description superimposition processing step, performed by a description superimposition processing unit, of generating display data for displaying each of the portions determined to be the description portion as a description and superimposing the display data over the moving image data.

REFERENCE SIGNS LIST

10 Image processing system
101 Camera
102 Image processing apparatus
103-1 to 103-N Display device
111 Control unit
112 Imaging unit
113 Imaging signal processing unit
114 Image data output unit
121 Control unit
122 Image data input unit
123 Description determination processing unit
124 Display data generation unit
125 Superimposition unit
126 Image compression processing unit
127 Network interface
128 Recording unit
129 Face recognition processing unit
201 Presenter
202 Description field
203 Description

The invention claimed is:

1. An image processing apparatus comprising:
   circuitry configured to
   obtain moving image data of a presenter that presents a description onto a description field,
   determine a group of consecutive pixels in a current frame image of the moving image data based on difference values between pixels in the current frame image and pixels in a reference frame image,
   determine whether the group of consecutive pixels in the current frame image corresponds to a portion of the description,
   generate display data for displaying the portion of the description corresponding to the group of consecutive pixels when the group of consecutive pixels is determined to correspond to the description, and
   superimpose the display data over images of the moving image data.

2. The image processing apparatus according to claim 1, wherein the circuitry is configured to
   extract a difference value for each of the pixels between the current frame image and the reference frame image, determine the group of consecutive pixels having the difference values being a threshold or more, and determine whether or not the group of consecutive pixels corresponds to the portion of the description.

3. The image processing apparatus according to claim 2, wherein the circuitry is configured to
   determine whether or not the group corresponds to the portion of the description using a shape evaluation value, an extraction time evaluation value, and a stationary time evaluation value,
   obtain the shape evaluation value on a basis of an aspect ratio relationship of a smallest quadrilateral that includes the group and a largest quadrilateral included within the group,
   obtain the extraction time evaluation value on a basis of a difference value between the current frame image and the reference frame image among a plurality of past frames, for pixels included in the group, and
   obtain the stationary time evaluation value on a basis of a difference value between the current frame image and a preceding frame image among the plurality of past frames, for pixels included in the group.

4. The image processing apparatus according to claim 1, wherein the circuitry is configured to
   perform processing for enhancing visibility of the description when superimposing the display data over images of the moving image data.

5. The image processing apparatus according to claim 4, wherein the circuitry is configured to
   first perform processing of reducing resolution of the images of the moving image data and thereafter superimposes the display data over the images of the moving image data.

6. The image processing apparatus according to claim 4, wherein the circuitry is configured to
   first process the display data so that the portion determined to correspond to the description is bordered and displayed, and thereafter superimpose the display data over the images of the moving image data.

7. The image processing apparatus according to claim 4, wherein the circuitry is configured to
   first process the display data on a basis of color information of the moving image data so that color of the portion determined to correspond to the description is differentiated from color of a background image, and thereafter superimpose the display data over the images of the moving image data.

8. The image processing apparatus according to claim 1, wherein the circuitry is configured to
not superimpose the display data over the images of the moving image data when a state where a face of the presenter is facing front is detected on a basis of the moving image data.

9. The image processing apparatus according to claim 1, further comprising:
an imaging sensor configured to image a state where the presenter is presenting a description onto the description field, wherein
the circuitry is configured to process an imaging signal obtained by the imaging sensor and obtain the moving image data.

10. The image processing apparatus according to claim 1, wherein the circuitry is configured to
transmit the moving image data to an external device.

11. An image processing method comprising:
obtaining moving image data of a presenter that presents a description onto a description field;
determining a group of consecutive pixels in a current frame image of the moving image data based on difference values between pixels in the current frame image and pixels in a reference frame image;
determining, by processing circuitry, whether the group of consecutive pixels in the current frame image corresponds to a portion of the description;
generating display data for displaying the portion of the description corresponding to the group of consecutive pixels when the group of consecutive pixels is determined to correspond to the description; and
superimposing the display data over images of the moving image data.

12. The image processing method according to claim 11, wherein
the determining the group of consecutive pixels includes
extracting a difference value for each of the pixels between the current frame image and the reference frame image, and
determining the group of consecutive pixels having the difference values being a threshold or more; and
the determining whether the group of consecutive pixels in the current frame image corresponds to the portion of the description includes determining whether or not the group of consecutive pixels corresponds to the portion of the description.

13. The image processing method according to claim 12, wherein
the determining whether or not the group of consecutive pixels corresponds to the portion of the description includes determining whether or not the group corresponds to the portion of the description using a shape evaluation value, an extraction time evaluation value, and a stationary time evaluation value,
the shape evaluation value is based on an aspect ratio relationship of a smallest quadrilateral that includes the group and a largest quadrilateral included within the group,
the extraction time evaluation value is based on a difference value between the current frame image and the reference frame image among a plurality of past frames, for pixels included in the group, and
the stationary time evaluation value is based on a difference value between the current frame image and a preceding frame image among the plurality of past frames, for pixels included in the group.

14. The image processing method according to claim 11, wherein
the display data is not superimposed over the images of the moving image data when a state where a face of the presenter is facing front is detected on a basis of the moving image data.

15. A non-transitory computer-readable storage medium storing instructions which when executed by a computer cause the computer to perform:
obtaining moving image data of a presenter that presents a description onto a description field;
determining a group of consecutive pixels in a current frame image of the moving image data based on difference values between pixels in the current frame image and pixels in a reference frame image;
determining whether the group of consecutive pixels in the current frame image corresponds to a portion of the description;
generating display data for displaying the portion of the description corresponding to the group of consecutive pixels when the group of consecutive pixels is determined to correspond to the description; and
superimposing the display data over images of the moving image data.

* * * * *